(12) United States Patent
McGurk et al.

(10) Patent No.: US 10,431,253 B1
(45) Date of Patent: Oct. 1, 2019

(54) WAVEGUIDE INPUT COUPLER WITH ASYMMETRIC TAPER

(71) Applicant: Seagate Technology LLC, Cupertino, CA (US)

(72) Inventors: John Bernard McGurk, Derry (GB); Kelly Elizabeth Hamilton, Derry (GB); Aidan Dominic Goggin, Donegal (IE); Mark Anthony Gubbins, Donegal (IE)

(73) Assignee: Seagate Technology, LLC, Cupertino, CA (US)

( * ) Notice: Subject to any disclaimer, the term of this patent is extended or adjusted under 35 U.S.C. 154(b) by 0 days.

(21) Appl. No.: 15/598,506

(22) Filed: May 18, 2017

Related U.S. Application Data

(60) Provisional application No. 62/338,634, filed on May 19, 2016.

(51) Int. Cl.

| | | |
|---|---|---|
| *G02F 1/035* | (2006.01) | |
| *G02F 1/295* | (2006.01) | |
| *G02B 6/26* | (2006.01) | |
| *G02B 6/42* | (2006.01) | |
| *G11B 11/24* | (2006.01) | |
| *G02B 6/125* | (2006.01) | |
| *G02F 1/01* | (2006.01) | |
| *G11B 5/00* | (2006.01) | |

(52) U.S. Cl.
CPC ............. *G11B 11/24* (2013.01); *G02B 6/125* (2013.01); *G02F 1/011* (2013.01); *G02F 1/0136* (2013.01); *G11B 2005/0021* (2013.01)

(58) Field of Classification Search
CPC .... G02F 1/011; G02F 1/0136; G02F 2201/18; G02F 1/0118; G02F 3/022; G02B 6/1228; G02B 6/125; G02B 2006/12195; G11B 11/24
USPC .................................... 385/2, 3, 6, 9, 30, 43
See application file for complete search history.

(56) References Cited

U.S. PATENT DOCUMENTS

| | | | |
|---|---|---|---|
| 5,526,453 A | 6/1996 | Wolf et al. | |
| 5,559,912 A | 9/1996 | Agahi et al. | |
| 6,819,814 B2 | 11/2004 | Forrest et al. | |
| 9,064,527 B1 * | 6/2015 | Shi ........................ | G11B 5/6088 |
| 9,070,386 B2 * | 6/2015 | Peng ....................... | G02B 6/126 |
| 2008/0204916 A1 * | 8/2008 | Matsumoto ............ | G11B 5/314 |
| | | | 360/59 |
| 2013/0108212 A1 | 5/2013 | Peng et al. | |
| 2014/0270620 A1 * | 9/2014 | Anderson ................ | G02B 6/27 |
| | | | 385/11 |
| 2015/0131415 A1 * | 5/2015 | Peng .................... | G11B 5/1278 |
| | | | 369/13.32 |

\* cited by examiner

*Primary Examiner* — Kaveh C Kianni
*Assistant Examiner* — Hung Q Lam
(74) *Attorney, Agent, or Firm* — Hollingsworth Davis, LLC

(57) ABSTRACT

An input waveguide is disposed on a substrate-parallel plane and configured to receive light from an input surface. A mode converter joins the input waveguide at a junction away from the input surface. The mode converter converts the light from a fundamental mode to a higher-order mode. An input coupler is proximate to and overlapping the input waveguide parallel to the substrate-parallel plane. The input coupler extending from the input surface to the mode converter and has an asymmetric taper that transitions from a wider crosstrack dimension near the input surface to a narrower crosstrack dimension away from the input surface.

19 Claims, 8 Drawing Sheets

WAVEGUIDE INPUT COUPLER WITH ASYMMETRIC TAPER

RELATED PATENT DOCUMENTS

This application claims the benefit of Provisional Patent Application Ser. No. 62/338,634 filed on May 19, 2016, to which priority is claimed pursuant to 35 U.S.C. § 119(e), and which is incorporated herein by reference in its entirety.

SUMMARY

The present disclosure is related to a waveguide input coupler with an asymmetric taper. In one embodiment, an input waveguide is disposed on a substrate-parallel plane and configured to receive light from an input surface. A mode converter joins the input waveguide at a junction away from the input surface. The mode converter converts the light from a fundamental mode to a higher-order mode. An input coupler is proximate to and overlapping the input waveguide parallel to the substrate-parallel plane. The input coupler extending from the input surface to the mode converter and has an asymmetric taper that transitions from a wider crosstrack dimension near the input surface to a narrower crosstrack dimension away from the input surface.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, information bits are recorded in a storage layer at elevated temperatures. The heated area (e.g., hot spot) in the storage layer determines the data bit dimension. One way to achieve a tiny, confined hot spot is to use an optical near-field transducer (NFT), such as a plasmonic optical antenna or an aperture, integrated in an optical waveguide of high contrast in the index of refraction between the waveguide core and its claddings. A magnetic pole is placed in close proximity (e.g., 20-50 nm) to the NFT at the media-facing surface.

One way to launch light into the optical waveguide on a magnetic slider is to bond a light source on a top surface of the slider. Light exiting from a light source, for instance, an edge-emitting laser diode, is coupled into a slider-integrated optical waveguide by an input coupler. Light is delivered to a near-field transducer of the slider by a solid immersion mirror or by a channel waveguide. A laser diode with transverse electric (TE) mode may be selected as a light source for use with this type of waveguide. Transverse electric mode lasers are more commonly available and therefore provide greater choice in laser emission wavelength than that of a transverse magnetic (TM) mode laser. A TE-mode laser diode will generally emit light in a fundamental mode ($TE_{00}$).

Misalignment between the laser and the slider-integrated input coupler can have significant in device performance. Crosstrack direction misalignment in particular appears to make the largest contribution to current gaps between modelling and real-world measurements. In embodiments disclosed below, a waveguide system is described that increases existing coupling efficiency to the NFT and sets a template for mitigating the impact of misalignment. These embodiments include HAMR recording heads, and the concepts described below may be applicable to other optical devices.

In some embodiment, a HAMR recording head includes a spot-size converter (SSC), an optical alignment correction device and an integrated optical circuit device that ensures efficient coupling to an optical fiber while allowing a greater tolerance in the attachment of an external laser diode to a recording head for broad HAMR applications. The tapered nature of the SSC allows not only focusing of more light into the optical core and reducing the level of stray light in the device, but also delivers a large increase in mode conversion efficiency due to asymmetric tapering. The SSC input dimension also minimizes reflections and increase laser spot collection and confinement.

Figure 1:
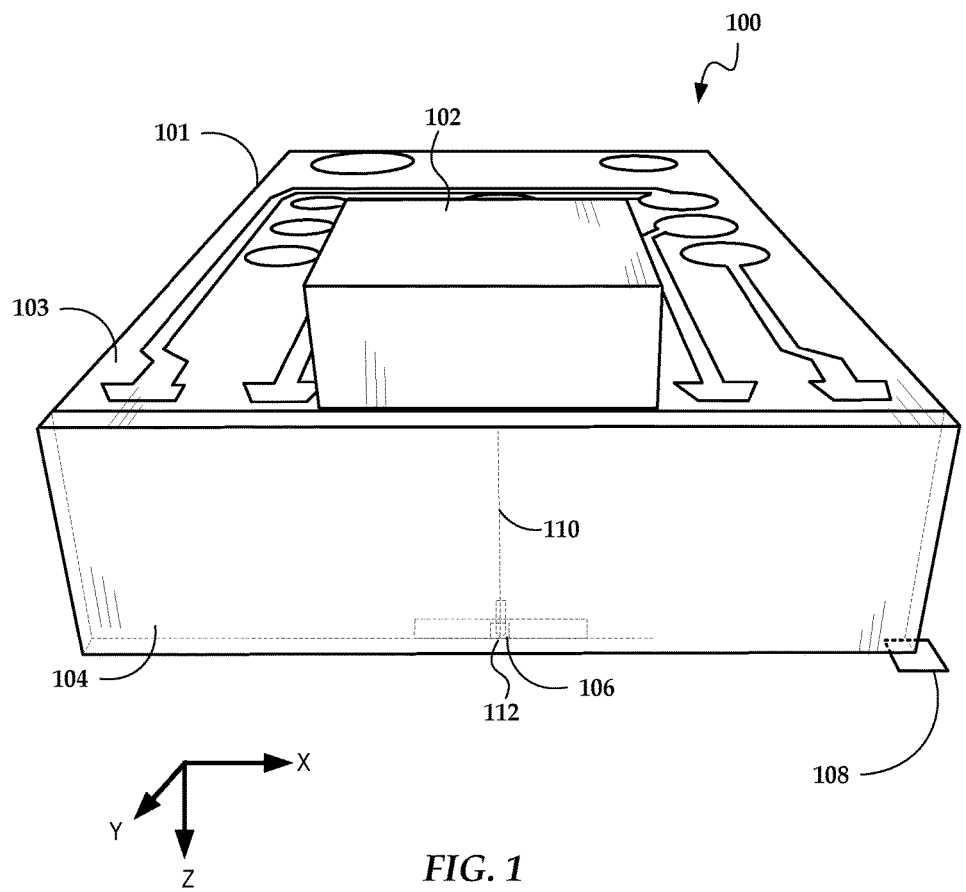
FIG. 1 is a perspective view of a slider assembly according to an example embodiment.

In reference to FIG. 1, a perspective view shows a HAMR recording head 100 according to an example embodiment. The recording head 100 may also be referred to as a slider, read head, write head, read/write head, etc. The recording head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air or helium.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, rhodium, platinum, iridium, etc. In some embodiments below, light is coupled into the near-field transducer 112 in a $TE_{10}$ mode, in which case the waveguide system 110 may utilize a $TE_{00}$ to $TE_{10}$ mode converter.

The laser diode 102 in this example may be configured as an edge-emitting laser. Generally, the edge-emitting laser, also called in-plane laser, emits light along the wafer surface of a semiconductor chip. An edge-emitting laser may be mounted on the top surface 103 of the slider body 101 (e.g., in a pocket or cavity) such that the light is emitted in a direction perpendicular to the media-facing surface (along the z-direction in this view).

While the example in FIG. 1 shows a laser diode 102 directly mounted to the slider body 101, the waveguide system 110 discussed herein may be applicable to any type of light delivery configuration. For example, a laser may be joined to the top surface 103 by way of a submount or other intermediate structure. The mounting surface 103 of the slider body 101 may include a mirror, lens, grating, facet, window or other coupling feature to receive light from the laser 102.

The coupling efficiency between the laser diode 102 and the waveguide system 110 may be sensitive to the relative alignment between the laser diode 102 and the mounting surface 103 of the slider body 101, which affects how light is injected to the slider body 101. Recent modelling illustrates the sensitivity of misalignment parameters such as injection spot-size, injection angle and polarization angle. Of these misalignment parameters, the crosstrack injection angle (crosstrack being along the x-axis in this example and corresponding to the slow axis of the laser diode 102) is found to have the greatest effect on coupling efficiency. It has been found that light emitted from a laser misaligned in this way gets lost in the cladding and remains unconverted via a mode converter that is located away from the mounting surface. Embodiments below include features to recover this unconverted light, and its asymmetric bias, while simultaneously making the coupling of light more efficient overall.

Figure 2:
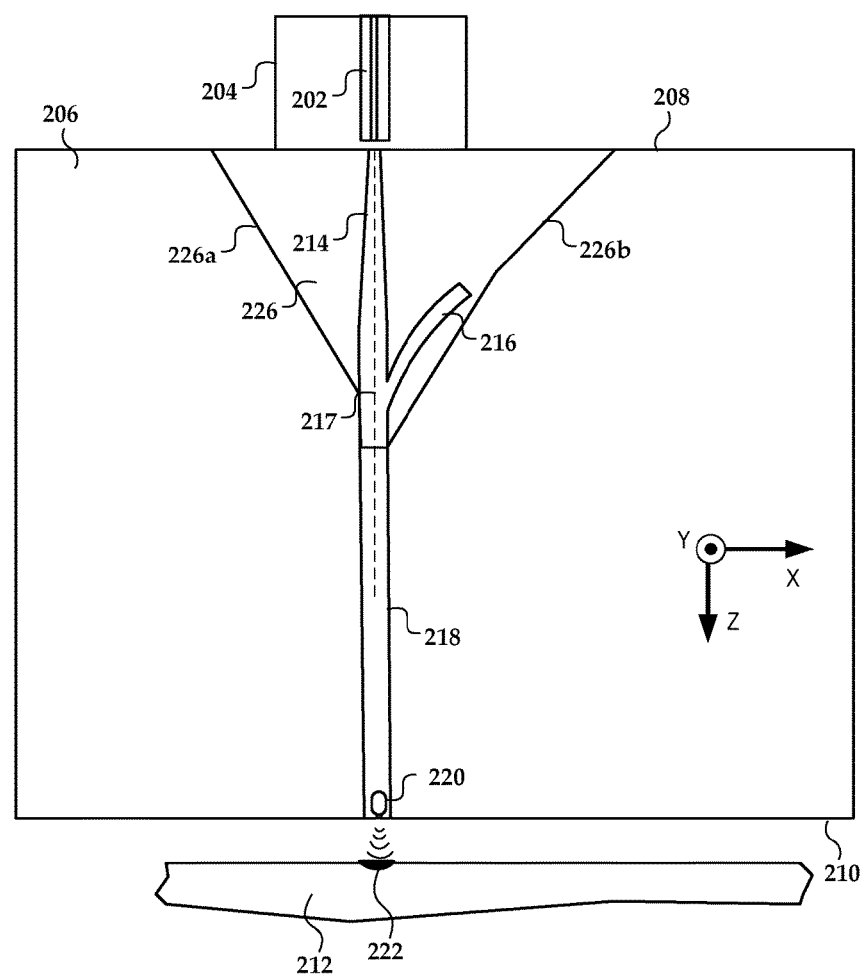
FIG. 2 is a substrate-parallel plane view showing geometry of a slider-integrated waveguide system according to an example embodiment.

In FIG. 2, a substrate-parallel plane view (e.g., parallel to slider trailing edge) shows geometry of a slider-integrated waveguide system 200 according to an example embodiment. An energy source 202, e.g., an edge-emitting laser diode, is mounted on a submount 204. The submount 204 is on a top surface 208 of a slider body 206. The top surface 208 is opposite a media-facing surface 210, which is held near a magnetic recording medium 212 while recording data.

The energy source 202 launches light into an input waveguide 214 of the integrated waveguide system. The input waveguide 214 includes a mode-converter, which in this case is configured as a branch waveguide 216 that joins the input waveguide 214 at a junction 217. The mode converter converts light from a primary mode (e.g., $TE_{00}$) to a higher-order mode (e.g., $TE_{10}$). The higher-order mode light is coupled to an NFT 220 located at an end of an output waveguide 218. The NFT 220 transmits energy out of the media-facing surface 210 to create a hotspot 222 on a recording medium 212.

Generally, the input waveguide 214, branch waveguide 216, and output waveguide 218 are waveguide cores that can be made from dielectric of high index of refraction, for instance, Ta2O5 (tantalum oxide), TiO2 (titanium oxide), Nb2O5 (niobium oxide), Si3N4 (silicon nitride), SiC (silicon carbon), Y2O3 (yttrium oxide), ZnSe (zinc selenide), ZnS (zinc sulfide), ZnTe (zinc telluride), Ba4Ti3O12 (barium titanate), GaP (gallium phosphide), CuO2 (copper oxide), and Si (silicon), etc. Cladding layers surround the core may each be formed of a dielectric material having a refractive index lower than the core, such as Al2O3 (aluminum oxide), SiO, SiO2 (silica), SiOxNy (silicon oxynitride), and AlN (aluminum nitride). An input coupler 226 (also referred to as a spot size converter) may be made from any of the dielectric materials listed for the core and cladding. Generally the material of the input coupler 226 is selected to have a refractive index between that of the core and the cladding.

The input coupler 226 is on a plane parallel to that of the input waveguide 214 (and also parallel to a substrate upon which the components are formed) but offset in a down track direction (y-direction) such that the input coupler 226 overlaps the input waveguide 214. The input coupler 214 tapers from a larger crosstrack width (x-dimension) proximate the input surface 208 to a wider crosstrack width proximate the branch waveguide mode converter 216. Note that the input coupler 226 is asymmetric. In this example, a shorter, first edge 226a faces away from the branch waveguide 216. The first edge 226a is linear and does not extend as far towards the media-facing surface 210 as a second edge 226b. The longer, second edge 226b of the input coupler, which is on the same side as the branch waveguide 216, has a segmented contour with at least two line segments. The asymmetry of the input coupler 226 can compensate for an inherent asymmetry of the branch waveguide 216. In some cases, the asymmetry and/or shape of the edges 226a-b can also increase mode conversion, help reduce back reflections into the laser, and reduce stray light transmitted elsewhere. Reduction in back reflections can reduce laser instability, and reduction in stray light can reduce heating of components in the head.

Figure 3:
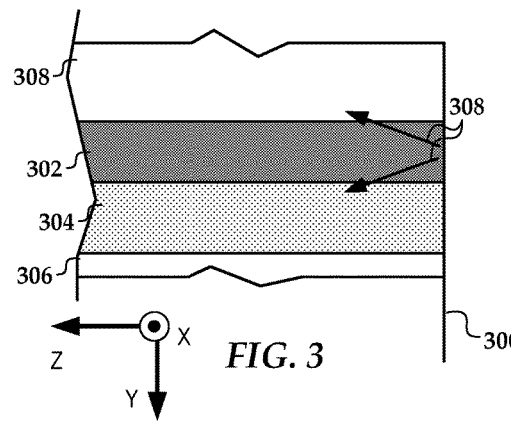
FIGS. 3-6 are diagrams illustrating laser-to-waveguide misalignment according to an example embodiment.

Because the branch waveguide mode converter 216 is asymmetric, in cases of misalignment, the level of mode conversion is also asymmetric. The asymmetric input coupler 214 reduces unconverted light through a combination of asymmetry and targeted coupler input truncation which can be tuned to the level of misalignment observed. In FIGS. 3-6, block diagrams illustrated various types of misalignment that may be dealt with by an input coupler according to example embodiments. In FIG. 3, a cross-sectional view is taken near an input surface 300, the input surface 300 being parallel to the xy-plane. A channel waveguide core 302 extends along a light-propagation direction (z-direction) and a bottom side of the core 302 is adjacent an intermediate-index material 304, which is surrounded by top and bottom cladding layers 306, 308 that have a lower index than the intermediate-index material 304. The intermediate-index material 304 is configured to act as an input coupler as described below.

Figure 4:
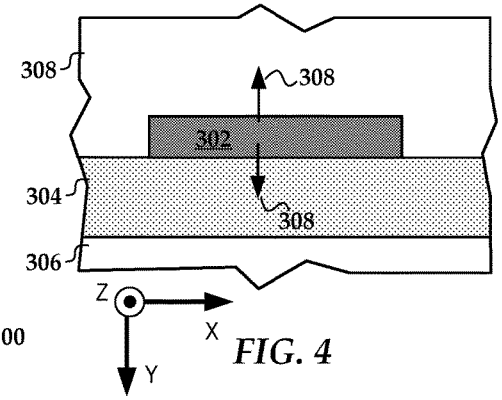
Figure 5:
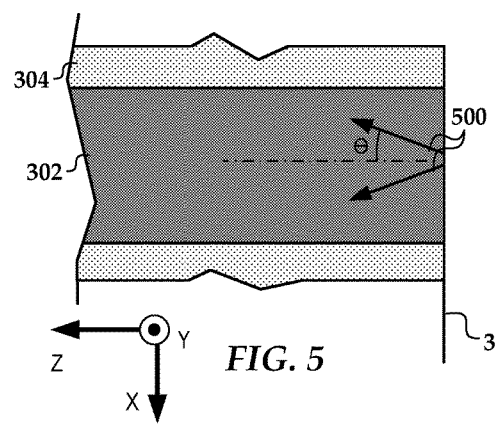
Figure 6:
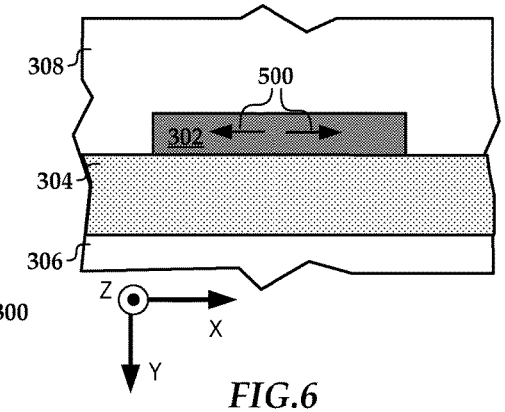

In FIGS. 4 and 6, the same waveguide is seen from a surface parallel to the input surface. In FIG. 5, a diagram shows a xz-plane cross-section taken through the middle of the core 302 near the input surface 300. The arrows 308 in FIGS. 3 and 4 represent an angular misalignment in the fast-axis, downtrack direction. The arrows 500 in FIGS. 5 and 6 represent an angular misalignment, θ, in the slow-axis, crosstrack direction. As noted above, the crosstrack misalignment has a greater effect on coupling efficiency than the downtrack misalignment.

An asymmetrical input coupler design as shown in FIG. 2 can help focus misaligned light back into waveguide, which has been demonstrated by modeling a ±5 degrees crosstrack misalignment of the light source relative to the light propagation direction. A summary of the modeling results are in Table 1 below, where θ is the angle of slow axis misalignment. As seen in Table 1, the unconverted light component ($TE_{00}$) drops significantly at θ=+5° compared with a symmetrical tapered coupler, while still providing roughly equivalent coupling efficiency. Because of the drop in unconverted light component, the converted TE$_{10}$ light component increases.

TABLE 1

|  | TE$_{10}$ light coupling | | Total light coupling | | TE$_{00}$ light coupling | |
| --- | --- | --- | --- | --- | --- | --- |
|  | θ = −5° | θ = +5° | θ = −5° | θ = +5° | θ = −5° | θ = +5° |
| Rectangular coupler | 38% | 38% | 45% | 45% | 1.5% | 1.5% |
| Symmetrical tapered coupler | 48% | 45% | 54% | 65% | 3.0% | 11% |
| Asymmetric tapered coupler | 40% | 46% | 53% | 61% | 5.9% | 6.3% |

One way to improve coupling efficiency of an input coupler, besides tuning asymmetry to a known level of misalignment, is to narrow the crosstrack dimension of the input coupler at the input surface. Some similar input couplers are formed as a 'slab' with a cross-track width that is semi-infinite relative to the mode of the injected light. When a slab is too big, the injected light and the coupler's own fundamental mode will have a poor overlap resulting in reduced coupling. As such, a truncated coupler uses a relatively narrower crosstrack width that is a good match to that of the injected light. For example, the crosstrack width can be selected so that the input coupler's natural fundamental mode and the mode of the laser spot in question have a good overlap. An example of this is shown in the block diagram of FIG. 7, which shows multiple views of an input coupler 700 and surrounding components according to an example embodiment. For purposes of illustration, the input coupler 700 is shown with a symmetric tapered outline, however the concepts are equally applicable to an asymmetric outline.

Figure 7:
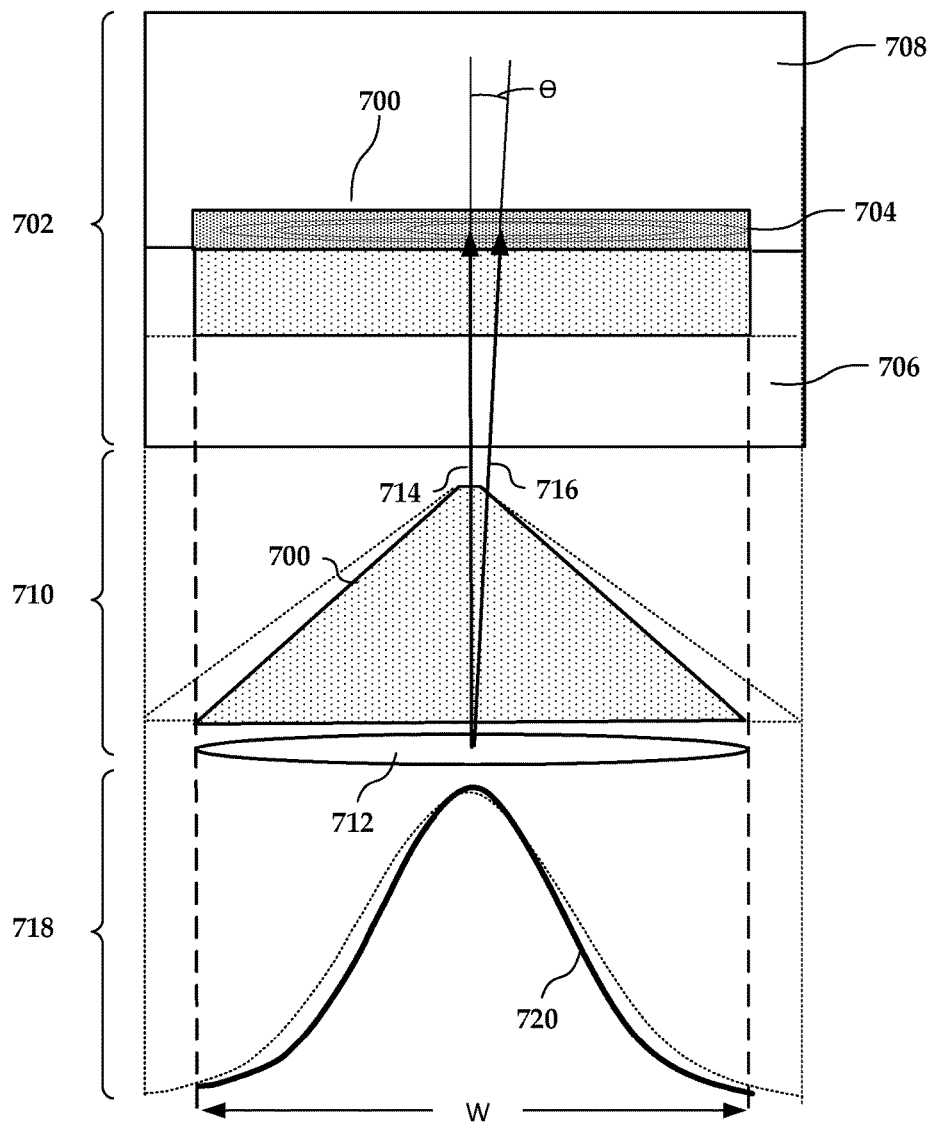
FIG. 7 is a diagram showing a truncated-width input coupler according to an example embodiment.

View 702 of FIG. 7 shows the input coupler 700 and a waveguide core 704 as seen from the input surface. Note that the input coupler 700 is surrounding the waveguide core 704 on two sides, although may surround the core 704 on one side in some configurations. The core 704 and input coupler 700 are surrounded by cladding layers 706, 708. View 710 is a top view of the input coupler 700, e.g., as seen on a substrate-parallel plane. Source 712 is shown emitting light 714 into the input coupler, and line 716 represents the light propagation direction if the source 712 is misaligned in the crosstrack direction (slow axis of the source 712). View 718 shows E-field distribution 720 emitted from the source 712.

Figure 8:
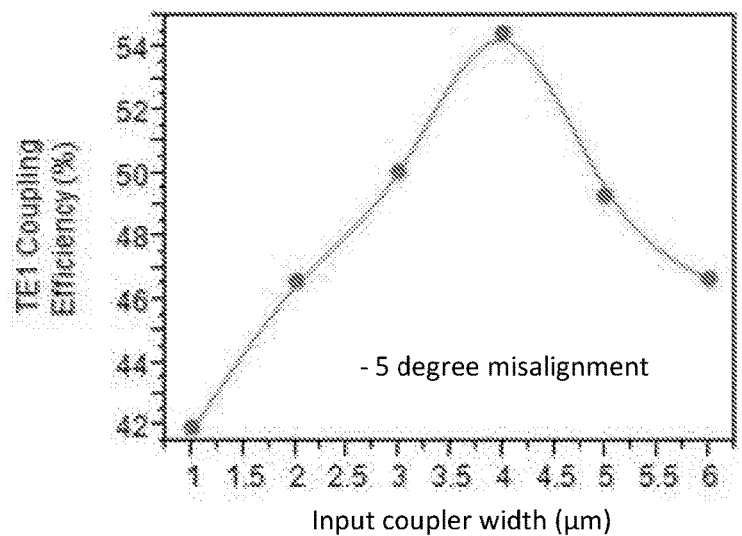
FIGS. 8-10 are graphs showing modeling results of an input coupler according to an example embodiment.
Figure 9:
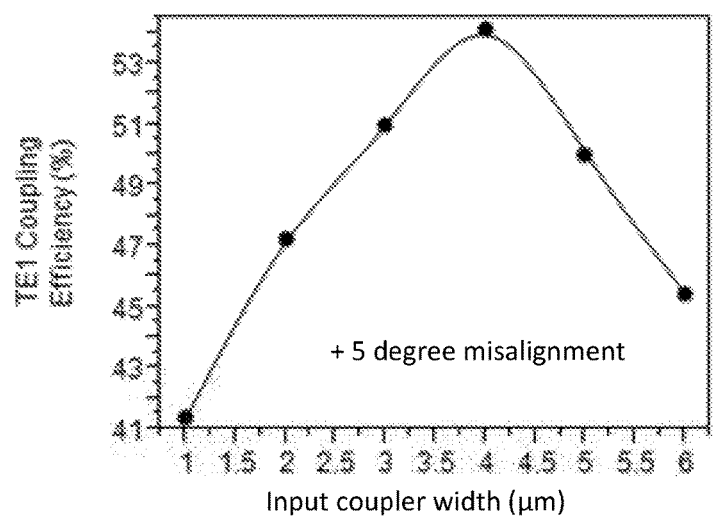

The dotted lines in FIG. 7 represent an input coupler width that may be considered semi-infinite for a particular spot diameter of the source 712. By choosing a truncated width W of the input coupler 700 that is less than this width, light can be more efficiently coupled if the source 712 is misaligned. A perfectly aligned laser (θ=0) will lose a small fraction of its beam to the cladding if the input coupler has truncated width W. This loss will be more than compensated for in misaligned cases by more effective coupling and conversion of light. This is shown in the graphs of FIGS. 8 and 9, which show TE$_{10}$ coupling efficiency for ±5 degree misalignments, respectively. Efficiency is maximum at 4 μm on both misalignment sides. Below 4 μm a tipping point is crossed whereby too much of the input spot is lost directly to the cladding. Above 4 μm too much collected TE$_{00}$ light is moving through the device unconverted and contributing to back reflections/laser instability, broad laser-induced write protrusion, etc.

Figure 10:
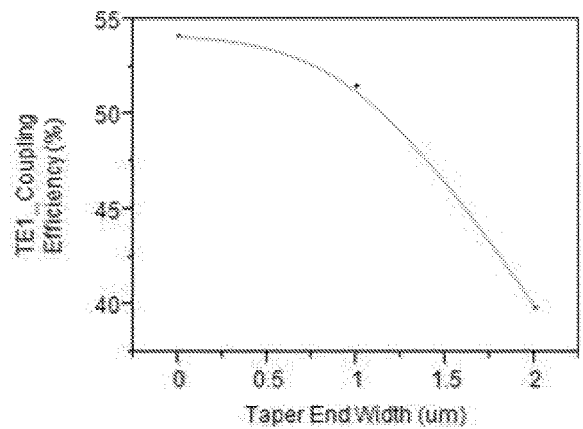

The input couplers described herein are tapered, such that an end away from the input surface is narrower than the end at the input surface. In FIG. 10, a graph shows the effect of the narrow-end width on coupling efficiency for a +5 degree misalignment. A truncated taper is optimized at a zero end width at the boundary of the bottom cladding layers. A non-zero end width has a shallow roll-off for coupling efficiency at first before gradually getting steeper. The TE$_{10}$ coupling efficiency optimized at ~54% for 5 degree misalignment In FIGS. 11 and 12, substrate-parallel, top and bottom views show a misalignment-targeting, truncated, tapered input coupler 1100 according to an example embodiment. The input coupler 1100 is shown below and above an input waveguide 1102 in FIGS. 11 and 12, respectively. The input waveguide 1102 is coupled to a branch waveguide 1104 that converts TE00 to TE$_{10}$ mode light, the latter being output along an output waveguide portion 1106. The input coupler 1100 has a longer edge 1100b and a shorter edge 1100a, both edges having a linear contour. A broad end 1100c of the input coupler 1100 is near an input surface 1108, and a narrow end 1100d of the input coupler is near the junction 1103 of the input waveguide 1102 and branch waveguide 1104. In this example, the shorter edge 1100a of the input coupler faces the branch waveguide 1104. This geometry incorporates input width truncation, asymmetry and end tapering as described above. The input width of end 1100c is 4 μm and the width of end 1100d is substantially zero.

As indicated by centerline 1112, end 1100d of the input coupler 1100 is centered below the junction 1103 of waveguides 1102, 1104 that form the TE$_{00}$-to-TE$_{10}$ mode converter and not below the input channel waveguide 1110, the center of which is indicated by centerline 1110. The following parameters were used to model performance of this configuration: top cladding material—AlO (n=1.63); core material—TaO (n=2.08); input coupler material—SiOxNy (n=1.7); top cladding thickness=100 nm above waveguide core; and 240 nm everywhere else; core thickness=140 nm; input coupler thickness=800 nm; and light wavelength=830 nm. The narrow endpoint 1100d is in the middle of the junction 1103, but at end 1100c, dimension 1100f is 0.33 um wider than the dimension 1100e, giving a ratio of ~1.18:1 assuming the end 110c has crosstrack width of 4 μm.

Figure 11:
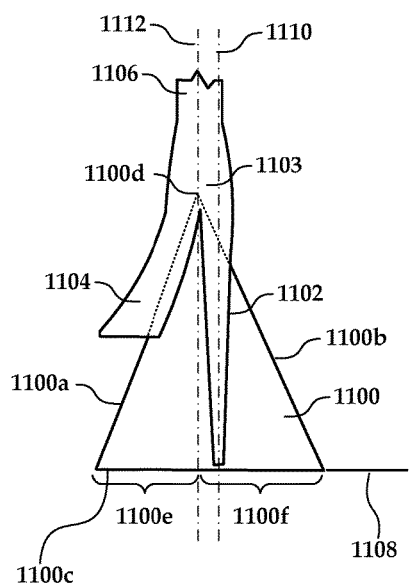
FIGS. 11 and 12 are diagrams showing an input coupler according to another example embodiment.
Figure 12:
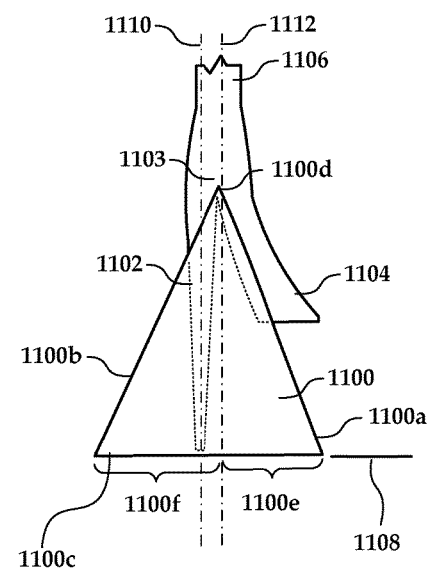
Figure 13:
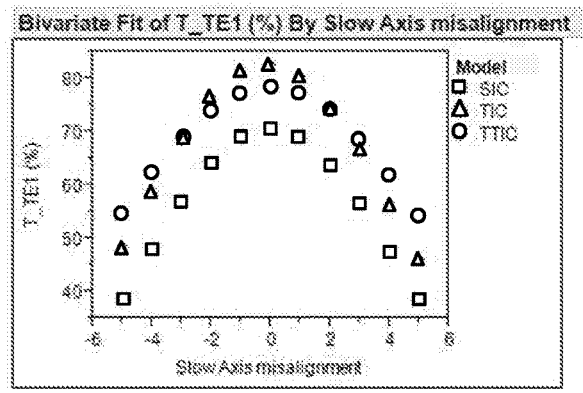
FIGS. 13-15 are graphs showing modeling results of an input coupler according to another example embodiment.
Figure 14:
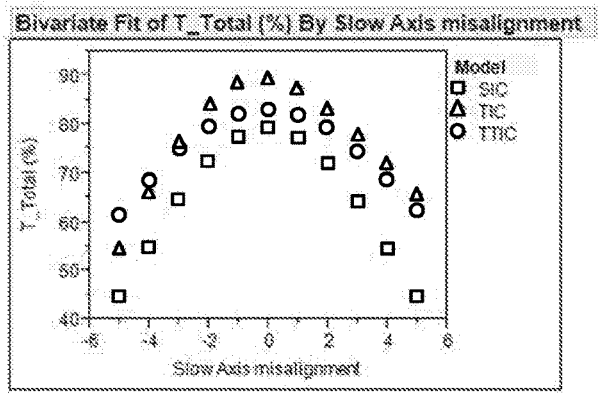
Figure 15:
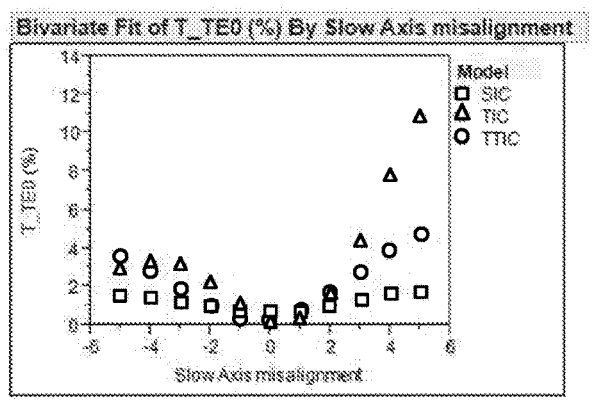

In FIGS. 13-15, graphs show the performance of the arrangement shown in FIGS. 11 and 12 based on this modeling. The performance of the truncated, asymmetric coupler (TTIC) is compared to a rectangular input coupler (SIC) and symmetric tapered coupler (TIC). The graph of FIG. 15 shows the truncation reduces TE$_{00}$ with right-sided misalignment compared with the non-truncated embodiment in FIG. 2 (about 4% in FIG. 15 versus 6.3% in Table 1). A corresponding increase in TE$_{10}$ light component is seen in FIG. 13, particularly at higher degrees of misalignment.

Both total and TE$_{10}$ transmissions indicate a significantly shallower roll-off for a TTIC than for either the SIC or the TIC designs. This illustrates the reduced sensitivity and increased tolerance to cases of injection misalignment. The TTIC design occupies a larger area under the TE$_{10}$ light curve (751 for TTIC, versus 737 for TIC and 622 for SIC) indicating that, regardless of the degree of misalignment, the TTIC will still deliver more TE10 light overall to the NFT than other designs. For +/−5 degree misalignment TTIC is ~21% more efficient than the SIC and ~2% more efficient than TIC. In instances where the degree of misalignment is better understood (e.g. +/−2 degrees) the TTIC would deliver an even larger gain over the other two designs comparatively. TTIC offers highly efficient mode conversion which responds to modelling tests of injection misalignment indicating that the losses incurred in the particularly sensitive slow-axis (crosstrack) injection direction can be substantially mitigated.

In summary, an asymmetric, tapered input coupler is described that increases the overall conversion efficiency at the NFT. This reduces stray light that could lead to reflections back into the laser or elsewhere. The stray light can contribute to laser instability or light that leads to protrusion at the ABS. In cases of perfect laser alignment, this tapered input coupler still offers a TE1 mode conversion gain of ~8% over a rectangular input coupler at the ABS (78% vs 70%).

Figure 16:
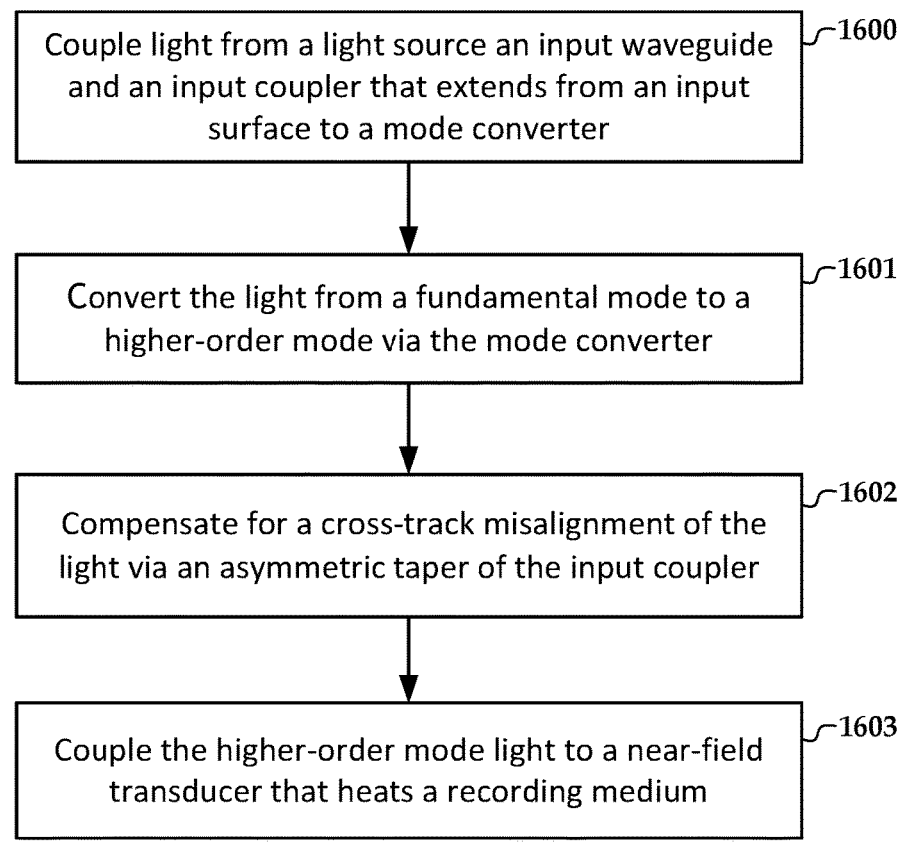
FIG. 16 is a flowchart illustrating a method according to an example embodiment.

In FIG. 16, a flowchart illustrates a method according to an example embodiment. The method involves coupling 1600 light from a light source through an input surface to an input waveguide and an input coupler. The input coupler and input waveguide are each disposed on different substrate-parallel planes of a slider. The input coupler is proximate to and overlapping the input waveguide and extends from the input surface to a mode converter that joins the input waveguide at a junction away from the input surface. The light is converted 1601 from a fundamental mode to a higher-order mode via the mode converter. A crosstrack misalignment of the light with the input surface is compensated for 1602 via an asymmetric taper of the input coupler that transitions from a wider dimension in crosstrack direction near the input surface to a narrower crosstrack dimension away from the input surface. Optionally the, higher-order mode light can be coupled 1603 to a near-field transducer that heats a recording medium in response thereto.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
    an input waveguide disposed on a substrate-parallel plane and configured to receive light from an input surface of the apparatus;
    a mode converter joining the input waveguide at a junction away from the input surface, the mode converter converting the light from a fundamental mode to a higher-order mode; and
    an input coupler proximate to and overlapping the mode converter parallel to the substrate-parallel plane and offset therefrom in a downtrack direction, the input coupler extending from the input surface to an output end of the mode converter and comprising first and second edges forming an asymmetric taper that transitions from a wider crosstrack dimension near the input surface to a narrower crosstrack dimension away from the input surface, the mode converter located between the first and second edges.

2. The apparatus of claim 1, wherein the light is coupled to the input waveguide in a $TE_{00}$ mode and converted to a $TE_{10}$ mode by the mode converter.

3. The apparatus of claim 1, wherein the input waveguide extends in a light propagation direction towards a media-facing surface, and wherein the asymmetric taper of the input coupler compensates for a crosstrack misalignment of the light relative to the light propagation direction.

4. The apparatus of claim 1, where the mode converter comprises a branch waveguide extending from the junction towards the input surface.

5. The apparatus of claim 4, wherein the asymmetric taper compensates for an asymmetry of the branch waveguide.

6. The apparatus of claim 4, wherein the end of the input coupler having the narrower dimension is centered over the junction of the input waveguide and the branch waveguide.

7. The apparatus of claim 6, wherein the junction is offset from a centerline of the input waveguide.

8. The apparatus of claim 1, wherein the first and second edges comprise a longer, linear edge and a shorter, linear edge that form the asymmetric taper.

9. The apparatus of claim 1, wherein the first and second edges comprise a longer edge with at least two linear segments and a shorter, linear edge that form the asymmetric taper.

10. The apparatus of claim 1, further comprising:
    an output waveguide coupled to the mode converter that receives the light at the higher order mode; and
    a near-field transducer that receives the light at the higher order mode and heats a recording medium in response thereto.

11. The apparatus of claim 1, wherein the wider crosstrack dimension is selected so that a fundamental mode of the input coupler overlaps with that of the light received from the input surface.

12. A method comprising:
    coupling light from a light source through an input surface to an input waveguide and an input coupler each disposed on different substrate-parallel planes of a slider offset from each other in a downtrack direction, the input coupler proximate to and overlapping the mode converter and extending from the input surface to a mode converter that joins the input waveguide at a junction away from the input surface;
    converting the light from a fundamental mode to a higher-order mode via the mode converter; and
    compensate for a crosstrack misalignment of the light with the input surface via first and second edges of the input coupler that form an asymmetric taper, the asymmetric taper transitioning from a wider dimension in crosstrack direction near the input surface to a narrower dimension away from the input surface, the mode converter located between the first and second edges.

13. The method of claim 12, further comprising coupling the higher-order mode light to a near-field transducer that heats a recording medium in response thereto.

14. An apparatus comprising:
    an input waveguide disposed on a substrate-parallel plane and configured to receive light from an input surface of the apparatus;

a branch waveguide joining the input waveguide at a junction away from the input surface, the branch waveguide converting the light from a fundamental mode to a higher-order mode; and an input coupler proximate to and overlapping the branch waveguide parallel to the substrate-parallel plane and offset therefrom in a downtrack direction, the input coupler extending from the input surface to the junction of the branch waveguide and comprising first and second edges forming an asymmetric taper that transitions from a wider crosstrack dimension near the input surface to a narrower crosstrack dimension at the junction, the asymmetric taper compensating for an asymmetry of the branch waveguide the branch waveguide being located between the first and second edges.

15. The apparatus of claim 14, wherein the light is coupled to the input waveguide in a $TE_{00}$ mode and converted to a $TE_{10}$ mode via the branch waveguide.

16. The apparatus of claim 14, wherein the input waveguide extends in a light propagation direction towards a media-facing surface, and wherein the asymmetric taper of the input coupler compensates for a crosstrack misalignment of the light relative to the light propagation direction.

17. The apparatus of claim 14, wherein the end of the input coupler having the narrower dimension is centered over the junction of the input waveguide and the branch waveguide.

18. The apparatus of claim 14, further comprising:
an output waveguide coupled to the input waveguide and branch waveguide, the output waveguide receiving the light at the higher order mode; and
a near-field transducer that receives the light at the higher order mode and heats a recording medium in response thereto.

19. The apparatus of claim 14, wherein the wider crosstrack dimension is selected so that a fundamental mode of the input coupler overlaps with that of the light received from the input surface.

\* \* \* \* \*